Oct. 6, 1931.  W. F. NAYLOR ET AL  1,826,016
APPARATUS FOR SHEARING ALUMINUM SECTIONS
Filed June 7, 1929  2 Sheets-Sheet 2
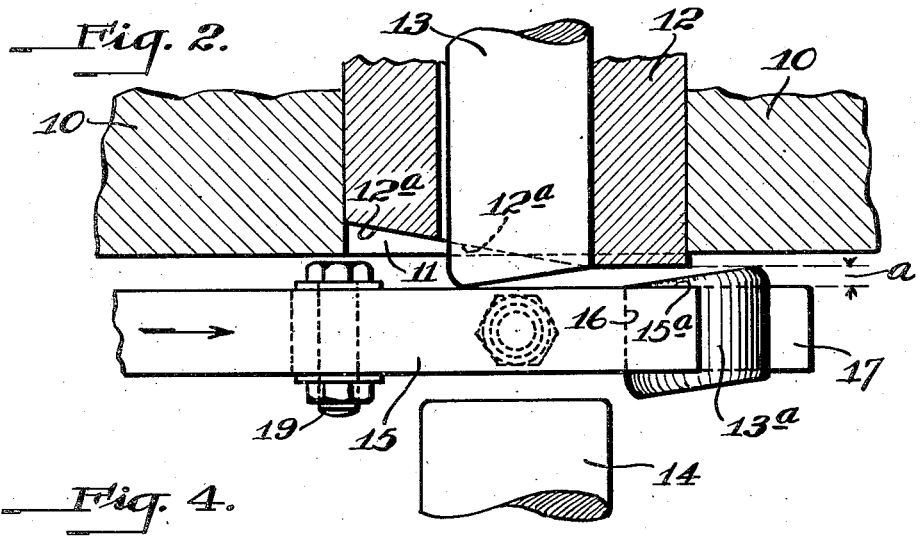
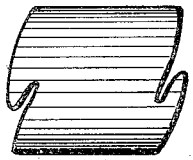
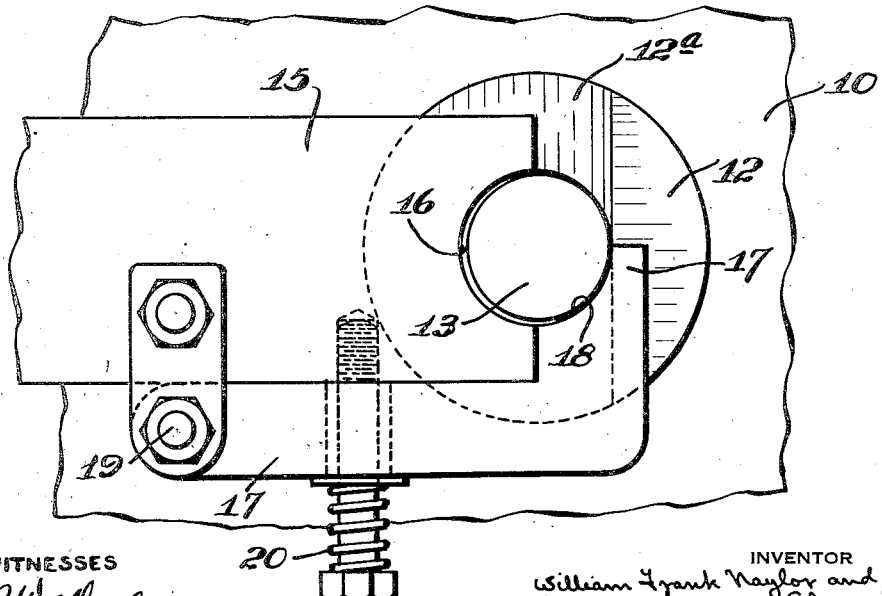
INVENTOR
William Frank Naylor and
Emory Lawrence Sponseller
By Brown & Critchlow
attys Patented Oct. 6, 1931

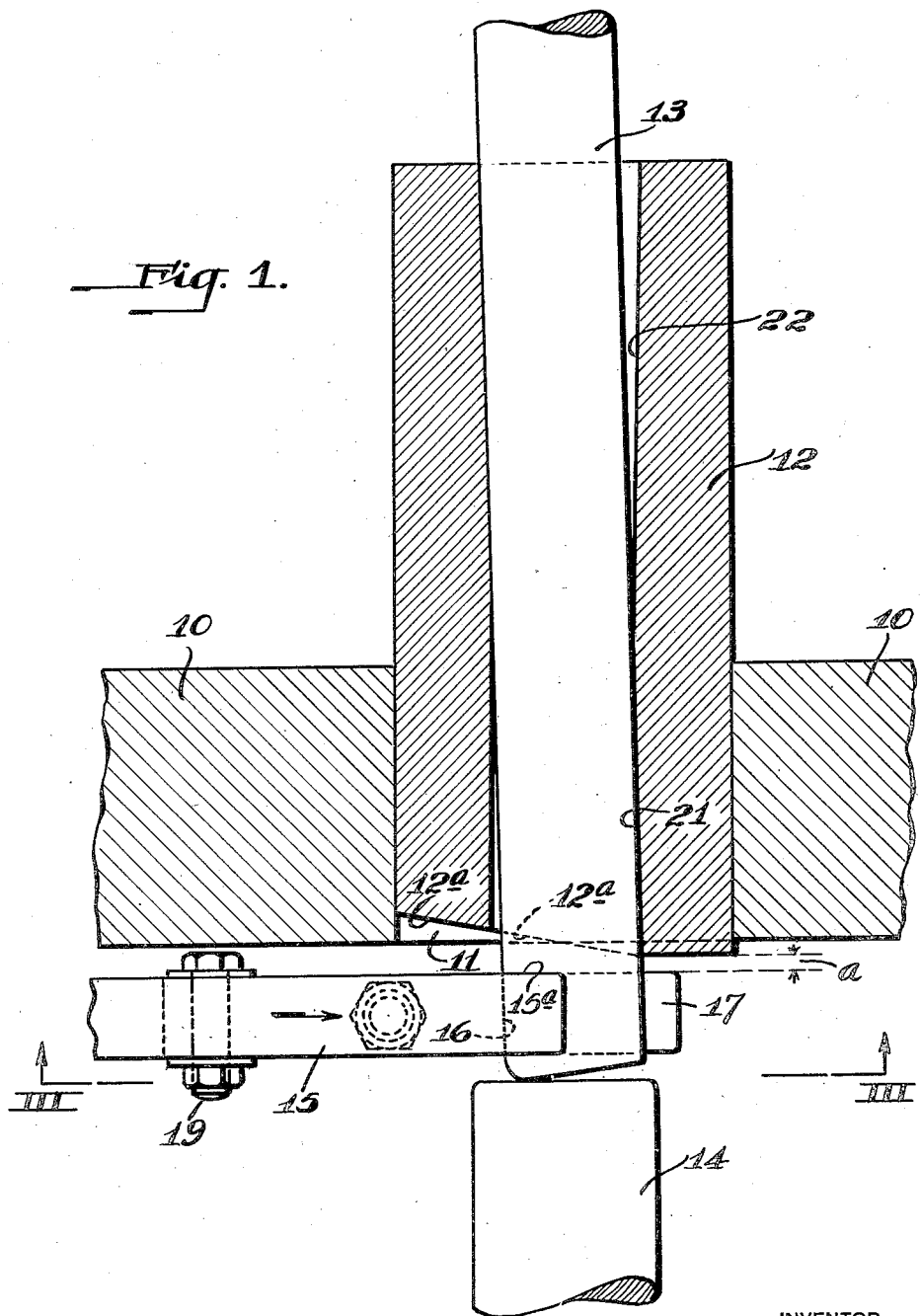

1,826,016

UNITED STATES PATENT OFFICE

WILLIAM FRANK NAYLOR, OF BERGEN FIELD, AND EMERY LAWRENCE SPONSELLER, OF GRANTWOOD, NEW JERSEY, ASSIGNORS TO ALUMINUM SCREW MACHINE PRODUCTS COMPANY, OF EDGEWATER, NEW JERSEY, A CORPORATION OF NEW JERSEY

APPARATUS FOR SHEARING ALUMINUM SECTIONS

Application filed June 7, 1929. Serial No. 369,097.

This invention relates to apparatus for the shearing of aluminum sections which are to be subsequently extruded, by which is meant cylindrical or other sections of either aluminum or aluminum base alloy stock which is sheared into suitable lengths for extruding into various articles. While the invention is unlimited to the shearing of aluminum sections for extruding into any particular article, it is especially applicable to the cutting of slugs used in extrusion processes in the manufacture of automobile tire valve stems, tubing and other articles, with reference to which it will now be described.

In the extrusion of blanks for use in the manufacture of automobile tire stems, a cylindrical section or rod of aluminum or of a suitable aluminum base alloy, both of which are herein contemplated by the term aluminum, is sheared to form slugs each having the required amount of metal to form a stem blank. The slug, after having been centrally perforated, is placed in a suitable press and extruded in a manner now known in this art to form a blank having a central opening extending through it and comprising a shank and a head or laterally extending flange at one end of the shank.

In shearing aluminum sections for this and like processes by apparatus as heretofore employed, considerable difficulty has been experienced arising from the creating of laps or folds of metal on the severed faces of the slugs. When a slug having such shear laps is extruded or otherwise worked, the laps form planes of weakness in the worked articles which render them defective and unsuitable for use where strength is required. To remove these laps prior to subjecting the slugs or sheared blanks to working, requires special machine or chipping operations which add to the cost of manufacture and to the cost incident to scrap losses.

The principal object of this invention is to provide apparatus for shearing aluminum sections of cylindrical or like shape which will avoid the above difficulty, and produce slugs the sheared faces of which are free from laps or folds, so that the slugs are immediately ready for extrusion or other working without the necessity of any special cutting or shipping operation.

The invention will be further explained with reference to the accompanying drawings, of which Fig. 1 is a central sectional plan, showing the position of the shearing members at the beginning of a shearing operation; Fig. 2 a similar view showing the position of these members at the completion of a shearing operation, the form of the slugs sheared being illustrated in this view; Fig. 3 is a sectional side view of the apparatus, the section being taken on the line III—III of Fig. 1 looking in the direction of the arrows; and Fig. 4 is a view of a similar slug having the laps which have characterized aluminum slugs sheared by prior apparatus, which laps it is the principal object of this invention to avoid.

An apparatus for shearing cylindrical aluminum sections of 7/8" diameter has been selected for description and illustration, and the dimensions employed in that apparatus are given herein for purposes of illustration. Such apparatus comprises a base 10 having a socket 11 formed therein in which is mounted a fixed die 12 having a passage formed therethrough for receiving the aluminum section 13, in the form of a rod, which is to be sheared into short slugs. A stop or abutment 14 is disposed opposite one end of the passage in the fixed die 12, so that the end of the section 13 can be fed into engagement with such stop, and the length of the end to be sheared off be thereby determined. A movable die 15 is disposed between the fixed die 12 and the stop 14 and is formed with a semi-circular portion 16 for engaging the section 13. A retaining member 17 is mounted on the movable die 15 and is formed with an arc-shaped portion 18 which normally constitutes a continuation of the semi-circular portion 16 of the die 15. For purposes connected with subsequent operations on the sheared slugs, not involved here, the member 17 is pivoted, at 19, to the movable die 15, and normally held in operative relation therewith by means of a spring 20. The emi-circular portion 16 and arc-shaped portion 18 constitute a passage in the movable die 15, into which the section 13 may be passed in feeding it into engagement with the stop 14, this passage being in registry with the passage of the fixed die 12 when the movable die 15 is in the retracted position shown in Fig. 1. Suitable means, of a well-known character and not necessary to be shown, are provided for reciprocating the movable die 15 in a plane which is perpendicular to the axis of the passage of the fixed die 12; so that when the die 15 is moved to the right, into the position shown in Fig. 2, a slug 13a is sheared off from the end of the section 13, and carried along with the movable die 15, for instance to another station in the machinery, where it is further worked.

The movable die 15 is so mounted for reciprocation that a material clearance, indicated at a (Figs. 1 and 2,) exists between the inner face 15a of that die and the face of that portion of the fixed die 12 which has shearing engagement with the work at one end of its diameter in the direction of shearing. The amount of this clearance a, found to give satisfactory results in the particular apparatus herein described and shown, is in the neighborhood of eighteen per cent of the diameter of the section 13, or about $\frac{5}{32}''$. Further, the face of the fixed die 12 is beveled inwardly and rearwardly from the portion of such die which has shearing engagement with the work at one end of its diameter in the direction of shearing, as indicated at 12a. An angle of about 10°, with respect to a perpendicular passing through the axis of the passage in the fixed die 12, for this bevel has been found to give satisfactory results in the particular apparatus herein described and shown. We have discovered that by thus beveling or inclining the face of the die 12 excellent results are secured in the way of avoiding such shear laps and folds as are shown in Fig. 4, which have been a material defect in the slugs as sheared by prior apparatus. We have further discovered that if the passage in the fixed die 12 is made of a somewhat greater diameter than the section 13, so as to provide a slight clearance around such section, permitting the latter to spring or bend somewhat during the shearing operation, as indicated in Fig. 1, further good results are obtained in the way of obtaining a clean sheared surface and avoiding laps and folds. To this end, in the apparatus shown, the inner portion, 21, of the passage is of a uniform diameter somewhat greater than that of the section 13, the increase of diameter, in this particular apparatus, being about 4% of the diameter of the stock, or in the neighborhood of $\frac{1}{32}''$. This uniform inner portion 21 of the passage is of a sufficient length to permit repeated grinding of the die without any resulting variation in the diameter of the passage. The outer portion, 22, of the passage is made to taper slightly outward towards the outer end, thereby providing room for the shank of the section 13 to spring or bend somewhat.

By the apparatus described above we are able to obtain slugs (13a, Fig. 2) the sheared surfaces of which are clean and free from laps or folds, and which may immediately be used, without any special cutting or chipping operation, in further working such as extrusion or compressing into a blank form desirable for subsequent extrusion.

While we have described one form of apparatus embodying our invention, and given dimensions thereof found to be satisfactory for a certain size and shape of section to be sheared, we wish it particularly understood that changes may be made in the apparatus itself and in the construction and arrangement of the parts thereof, and that the dimensions are subject to variation, especially in connection with the shearing of sizes and cross sectional shapes different from that selected for illustration, while still employing the principles which we have discovered, what we claim being:

1. An apparatus for shearing aluminum sections, comprising a pair of dies mounted for relative shearing movement and having work-engaging portions, one of said dies having its face which is opposed to the other die inclined, in advance of its work-engaging portion, away from a plane parallel with the direction of such movement.

2. An apparatus for shearing aluminum sections, comprising a die shaped to receive the section to be sheared so as to permit bending or springing of such section during the shearing operation, and a second die, said dies being mounted for relative shearing movement and having work-engaging portions, and one of said dies having its face which is opposed to the other die inclined, in advance of its work-engaging portion, away from a plane parallel with the direction of such movement.

3. An apparatus for shearing aluminum sections, comprising a pair of dies mounted for relative shearing movement and having work-engaging portions, said dies being constructed and associated to engage the work at an angle less than a right angle, one of said dies having its face which is opposed to the other die inclined, in advance of its work-engaging portion, away from a plane parallel with the direction of such movement.

4. An apparatus for shearing aluminum sections, comprising a die having a passage therein for receiving the section, said passage being formed to provide a clearance permitting bending or springing of such section during the shearing operation, and a second die, said dies being mounted for relative shearing movement and having work-engaging portions, and one of said dies having its face which is opposed to the other die inclined, in advance of its work-engaging portion, away from the plane parallel with the direction of such movement.

5. An apparatus for shearing aluminum sections, comprising a pair of dies mounted for relative shearing movement and having work-engaging portions, said dies being separated to provide a clearance therebetween, and one of said dies having its face which is opposed to the other die inclined, in advance of its work-engaging portion, away from a plane parallel with the direction of such movement.

6. An apparatus for shearing aluminum sections, comprising a pair of dies mounted for relative shearing movement and constructed and associated so as to engage the work at an angle less than a right angle, said dies being separated to provide a clearance therebetween, and one of said dies having its face which is opposed to the other die inclined, in the direction of shearing movement, away from a plane parallel with the direction of such movement.

7. An apparatus for shearing aluminum sections, comprising a die having a passage therein for receiving the section, said passage being formed to provide a clearance permitting bending or springing of such section during the shearing operation, and a second die, said dies being mounted for relative shearing movement and being separated so as to provide a clearance therebetween, and one of said dies having its face which is opposed to the other die inclined, in the direction of shearing movement, away from a plane parallel with the direction of such movement.

In testimony whereof, we hereunto sign our names.

EMERY LAWRENCE SPONSELLER.
WILLIAM FRANK NAYLOR.